United States Patent [19]

Haug et al.

[11] 4,351,363

[45] Sep. 28, 1982

[54] HYDRO-PNEUMATIC PRESSURE VESSEL

[75] Inventors: Gerhard Haug, Sachsenheim; Heinz Siegel, Stuttgart, both of Fed. Rep. of Germany

[73] Assignee: Robert Bosch GmbH, Stuttgart, Fed. Rep. of Germany

[21] Appl. No.: 130,091

[22] Filed: Mar. 12, 1980

[30] Foreign Application Priority Data

Mar. 21, 1979 [DE] Fed. Rep. of Germany ....... 2911022

[51] Int. Cl.[3] .............................................. F16L 55/04

[52] U.S. Cl. ........................................ 138/30; 138/37

[58] Field of Search ................... 138/30, 37; 220/85 B

[56] References Cited

U.S. PATENT DOCUMENTS 2,439,053 4/1948 Moore .................................. 138/30

2,630,834 3/1953 Weber et al. ......................... 138/30

3,067,810 12/1962 Mozic .................................... 138/30

3,139,113 6/1964 Mercier ................................. 138/30

3,251,380 5/1966 Mercier ................................. 138/30

FOREIGN PATENT DOCUMENTS 1264893 3/1968 Fed. Rep. of Germany ........ 138/30

*Primary Examiner*—Willis Little

*Attorney, Agent, or Firm*—Michael J. Striker

[57] ABSTRACT

A pressure vessel having a housing subdivided by a flexible partition into an upper gas portion and a lower liquid portion. The gas portion of the housing forms a gas chamber surrounding by an upper wall formed of curved lines of various radius. An inlet to receive a pressure gas is formed in the upper wall so that the inlet is positioned in the area of the upper wall outlined with a curve of a minimal radius. After loading of the pressure vessel with a gas under relatively high pressure the inlet is sealed by a locking element. In the area where the inlet with the locking element is positioned, the deformations exerted on the wall under gas pressure are minimal.

4 Claims, 4 Drawing Figures

HYDRO-PNEUMATIC PRESSURE VESSEL

BACKGROUND OF THE INVENTION

The present invention relates to a hydraulic system construction, and more specifically to a pressure vessel interposed in a hydraulic system.

In hydraulic systems it is frequently desirable to utilize a pressure vessel to dampen sudden peaks in the hydraulic pressure and to compensate for various pressure fluctuations. The pressure vessel is normally connected in a by-pass arrangement with a hydraulic system.

A conventional pressure vessel has a housing which consists of two portions one of which forms an upper chamber and the other forms a lower chamber. The interior chamber of the pressure vessel housing is subdivided by a diaphragm formed of elastic material to constitute the upper gas chamber and the lower liquid chamber. Connecting elements having an opening to receive a liquid medium into the liquid chamber is provided at the bottom of the housing. An inlet for a pressure gas medium is normally arranged in the upper wall surrounding the gas chamber.

A housing including a lower wall and an upper wall attached hereto is known, as for example from the U.S. Pat. No. 3,868,972. The upper wall constituting the upper portion of the housing is outlined by curves of various radii. A gas valve is arranged in the highest area of the curved upper wall. Pressure forces of gas medium exerted on the upper wall are the largest in the highest area of said wall since the liquid medium acting on the flexible partition and displacing gas is directed in an axial direction. This can cause large deformations of the upper wall of the housing and may cause deterioration of a locking element arranged in the pressure gas inlet which leads to a gas leakage from the gas chamber.

SUMMARY OF THE INVENTION

It is an object of this invention to improve a pressure vessel of the foregoing type.

Another object of this invention is to provide a properly sealed and relaible gas chamber in the pressure vessel housing.

These and other objects of the present invention are achieved by positioning a pressure gas inlet in an area of curved upper wall which is outlined with a curve of a minimal radius to thereby avoid the location of the gas inlet in the area of the largest pressure forces which can cause relatively large deformations of the upper wall. A locking element is arranged in the pressure gas inlet which may be in a form of a threaded plug, expander or a ball-like body.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION

Figure 1:
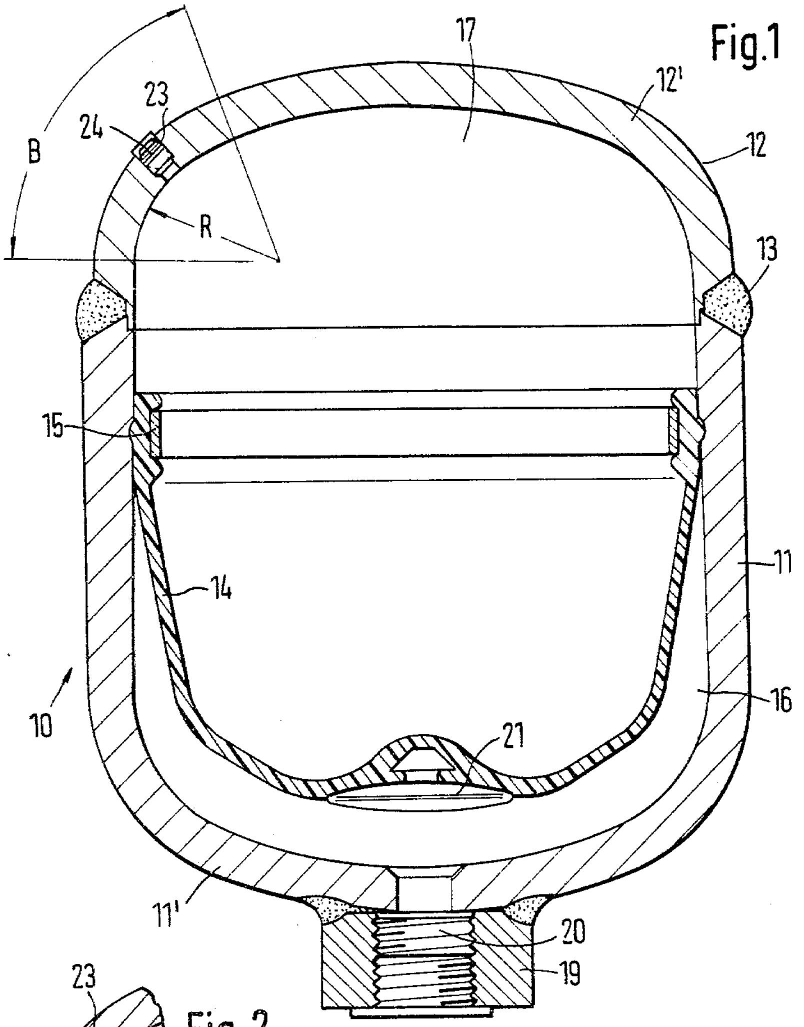
FIG. 1 is an axial sectional view through a pressure vessel in accordance with the present invention.
Figure 2:
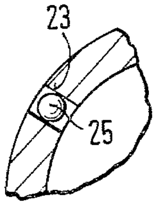
FIG. 2 is a partial sectional view showing another embodiment of a gas inlet of the pressure vessel housing.
Figure 3:
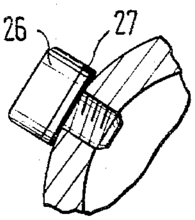
FIG. 3 is a partial sectional view of a third modification of the gas inlet with a locking element modification of the gas inlet with a locking element arranged therein.

A pressure vessel shown in FIG. 1 and generally designated 10 includes a housing having a lower housing portion 11 and and upper housing portion 12 which resembles a cover and is connected to the lower portion, as for example by means of a welding seam 13. The housing portions 11 and 12 are substantially of a cylindrical shape and have curved walls 11' and 12' respectively. An elastic diaphragm or flexible partition 14 is positioned in the interior of the housing to subdivide the housing into two chambers, an upper chamber 17 for a gas medium and a lower chamber 16 for a liquid medium. The flexible partition is supported in the housing 10 by means of a clamping ring 15 located between inwardly extending projections formed in the partition 14. A connecting member 19 is arranged at the bottom of the housing, oriented in an axial direction of the housing and connected thereto, as for example by means of welding. Connecting member 19 has a passage 20 for admitting a liquid into chamber 16. A locking member 21 made of metal is arranged on the lower portion of the flexible partition which faces passage 20 for the working liquid. In order to fill chamber 17 with a pressure gas medium the housing 10 is provided with a bore 23 which is formed in the upper wall 12'. The walls 11' and 12' are each shaped by curved lines at various radii which outline the surfaces of the chambers 17 and 16. The bore 23 is formed in the wall 12' at the area where the curve outlining the upper chamber 12 is formed with a minimal radius denoted R in the FIG. 1. Filling a pressure gas through the bore 23 in the area B minimizes tensile stresses exerting in the pressure vessel housing. This results in minimizing the deformation of the housing walls especially when bore 23 is closed by a locking element 24. The locking element is a very simple member and may be made in a form of so called expander as shown in FIG. 1 or a ball-like element 25 as shown in FIG. 2, where ball 25 is pressed by a relatively large force in the bore 23, or as a screw 26 inserted into bore 23 and arranged with a sealing ring 27.

Figure 4:
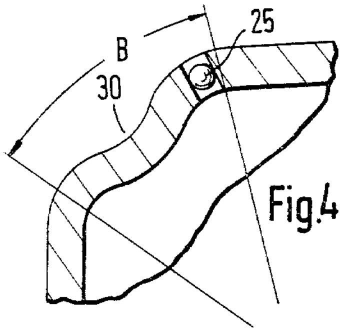
FIG. 4 is a partial sectional view of a fourth modification of the gas inlet area in accordance with the present invention.

FIG. 4 depicts an enlarged view of an embodiment of the upper wall 12', wherein area B is formed with a corrugation 30. The locking element 25 is positioned at a highest portion of corrugation 30.

In all the embodiments shown in FIGS. 1 through 4 the locking element is positioned in the area of the largest curving of the upper wall 12'. This arrangement prevents a possibility for a gas filled in the upper chamber to pressure the upper wall on the area subjected to the largest deformations and to permit the pressure gas to flow out from chamber 17 as quick as possible when the locking element 24 is released.

It will be understood that each of the elements described above, or two or more together, may also find a useful application in other types of constructions differing from the types described above.

While the invention has been illustrated and described as embodied in a pressure vessel of the foregoing type, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A pressure vessel, comprising a housing having a chamber surrounded by external walls; a flexible partition subdividing said chamber into a gas compartment and a liquid compartment and being flexed within said housing under pressure of liquid medium contained in said liquid compartment, said liquid compartment having an opening to receive said liquid medium, said external walls including an upper wall being formed with curved lines of radii of different lengths; an inlet formed in said upper wall surrounding said gas compartment to receive a gas medium therein; and a locking element located in said inlet, said upper wall having an area formed with a graded curve, said inlet being positioned in said area where said upper wall is formed with a curve of a minimum radius so that the gas medium filled in said gas compartment causes minimal deformations of said wall under gas pressure.

2. The pressure vessel of claim 1, wherein said locking element includes a threaded plug.

3. The pressure vessel of claim 1, wherein said locking element includes a ball-like member.

4. The pressure vessel of claim 1, wherein said locking element is an expander.

* * * * *